(12) United States Patent
Sivaraman (10) Patent No.: US 12,306,664 B1
(45) Date of Patent: May 20, 2025

(54) DYNAMIC PRECISION TIME MESSAGE RATE SUPPORT

(71) Applicant: DELL PRODUCTS L.P., Round Rock, TX (US)

(72) Inventor: Sanal Kumar Kariyezhath Sivaraman, Chennai (IN)

(73) Assignee: DELL PRODUCTS L.P., Round Rock, TX (US)

(*) Notice: Subject to any disclaimer, the term of this patent is extended or adjusted under 35 U.S.C. 154(b) by 89 days.

(21) Appl. No.: 18/510,372

(22) Filed: Nov. 15, 2023

(51) Int. Cl.
*G06F 1/12* (2006.01)

(52) U.S. Cl.
CPC .................................... *G06F 1/12* (2013.01)

(58) Field of Classification Search
CPC ................. G06F 9/44; G06F 1/32; G06F 1/12
See application file for complete search history.

(56) References Cited

U.S. PATENT DOCUMENTS

| | | | |
|---|---|---|---|
| 2003/0177154 A1* | 9/2003 | Vrancic | G06F 1/12 708/160 |
| 2021/0006344 A1* | 1/2021 | Chen | G01S 19/14 |

OTHER PUBLICATIONS

Ajmeri et al.,"Clocks, Time Error, and Noise," Cisco Press, Jan. 8, 2022. [online], [Retrieved Nov. 3, 2023]. Retrieved from Internet <URL: https://www.ciscopress.com/articles/printerfriendly/3128857> (31pgs).

\* cited by examiner

*Primary Examiner* — Keshab R Pandey
(74) *Attorney, Agent, or Firm* — BAUGH LAW, LLC (57) ABSTRACT

Mechanisms, such as Precision Time Protocol (PTP), exist to help with timing synchronization across devices in a network. Accuracy of time synchronization may depend on various parameters, but one of the major parameters is PTP packet rate. Typically, PTP uses a static configuration having a high packet rate, which is not only limiting, but can also affect device and network performance. Accordingly, embodiments herein enable dynamically changing one or more packet rates for sync messages based upon one or more metrics learned from the system related to clock synchronization.

20 Claims, 9 Drawing Sheets

DYNAMIC PRECISION TIME MESSAGE RATE SUPPORT

BACKGROUND

A. Technical Field

The present disclosure relates generally to information handling systems. More particularly, the present disclosure relates to synchronizing timing between information handling systems.

B. Background

The subject matter discussed in the background section shall not be assumed to be prior art merely as a result of its mention in this background section. Similarly, a problem mentioned in the background section or associated with the subject matter of the background section should not be assumed to have been previously recognized in the prior art. The subject matter in the background section merely represents different approaches, which in and of themselves may also be inventions.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For information handling system/computer networks, timing across the information handling system can be very important. To help facilitate time synchronization, different protocols exist. Precision Time Protocol (PTP) is one such network protocol that is used to synchronize clocks of information handling systems in a distributed computer system or network with high accuracy. It is particularly important in applications where precise timekeeping is critical, such as in industrial automation, telecommunications, financial trading, and scientific research. PTP is designed to achieve extremely accurate time synchronization among networked devices—to within nanosecond range. Having precise synchronization supports data integrity, verifies the order of events, and ensures that data records are accurately timestamped, which is critical for data integrity and auditing. Given the desired level of accuracy, system capability, and network, pre-defined PTP packet rate can be configured. Thus, time synchronization, such as PTP, plays a vital role in ensuring that different devices and systems can operate in a coordinated and synchronized manner.

While having time synchronization is important, establishing time synchronization involves a certain amount of overhead. Participation in PTP can involve exchanging a number of messages. One major use case of PTP on a network switch is a boundary clock (BC) where one port synchronizes time from the upstream node (e.g., grandmaster switch) and distributes time to downstream nodes (e.g., switches, servers, or radio units) through other ports. Based on default rate of ITU G.8275.1 profile, a two-step boundary clock with 47 master ports and 1 slave port needs to send 2648 packets per second and receives 808 packets per second. These packets create processing and networking loads that can affect the performance of information handling systems in the network and of the network itself.

Accordingly, it is highly desirable to find new, more efficient ways to support time synchronization while reducing the network traffic/overhead costs.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state. It shall be noted that references to a clock may be a synecdochic representation for an information handling system on which the clock operates.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

In one or more embodiments, a stop condition may include: (1) a set number of iterations have been performed; (2) an amount of time has been reached; (3) convergence (e.g., the difference between consecutive iterations is less than a first threshold value); (4) divergence (e.g., the performance deteriorates); and (5) an acceptable outcome has been reached.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of information handling system networks, aspects of the present disclosure are not so limited. Accordingly, the aspects of the present disclosure may be applied or adapted for use in other contexts.

A. General Overview

As noted previously, mechanisms, such as PTP (Precision Time Protocol), exist to help with timing synchronization across devices in a network. PTP has different versions, each of which is defined in an Institute of Electrical and Electronics Engineers (IEEE) 1588 standard, which is incorporated by reference herein in its entirety. PTP measures the communication path delay between two devices-a master and a receiver (or slave)—each with its own clock. To measure the delay, PTP involves determining the delay between messages transmitted between the master and slave devices. The accuracy of time synchronization may depend on various parameters. One of the major parameters is PTP packet rate.

Figure 1:
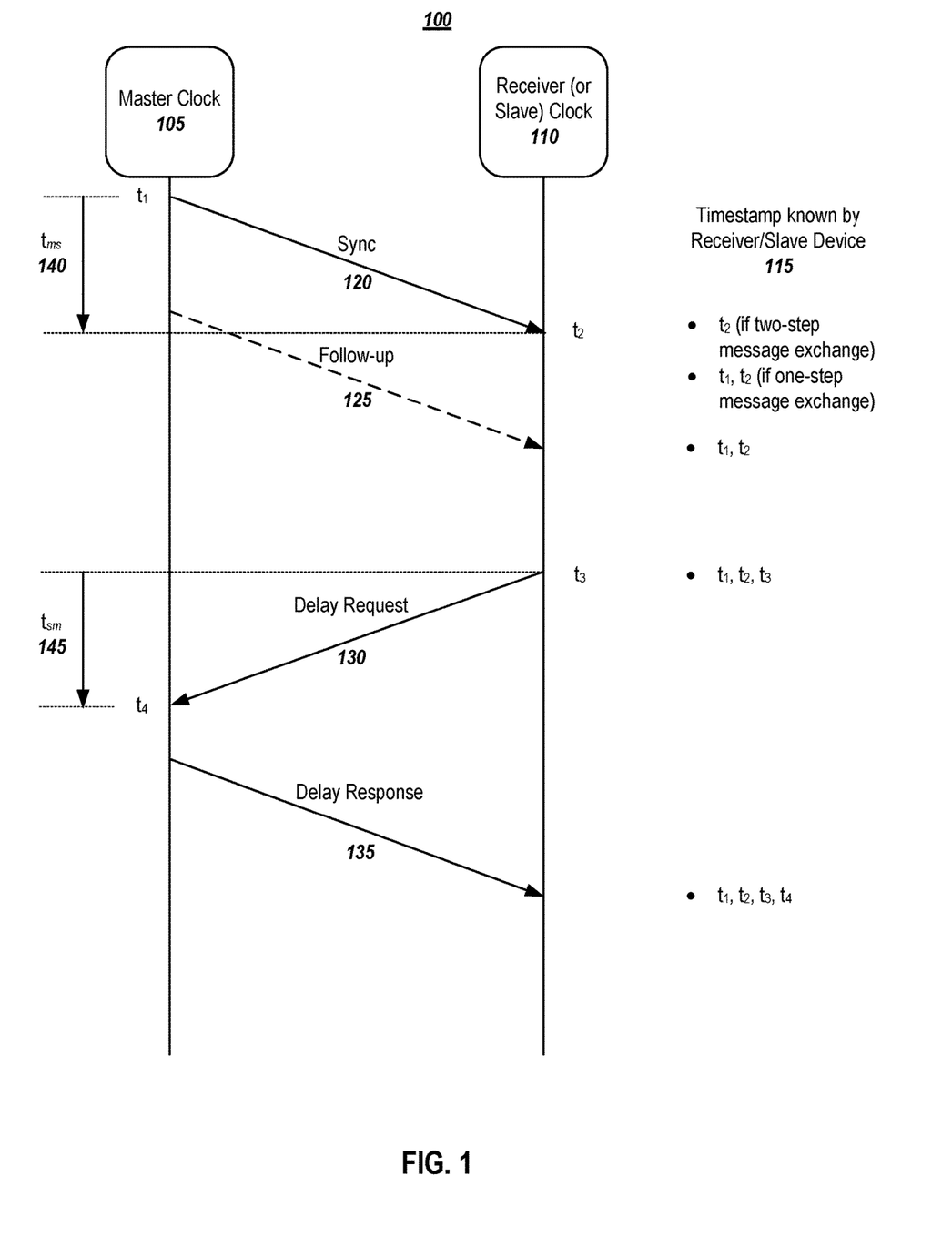
FIG. 1 ("FIG. 1") depicts an example of two clocks that participate in PTP message sharing by transmission of timestamped messages, according to embodiments of the present disclosure.

FIG. 1 depicts an example of two clocks that participate in PTP message sharing by transmission of timestamped messages, according to embodiments of the present disclosure. FIG. 1 illustrates a PTP end-to-end delay mechanism, which is an essential part of the protocol to account for the time it takes for synchronization messages to travel from the master clock to the slave clock, including propagation and processing delays. This mechanism is important because it allows the slave clock to correct its time accurately to match the master clock's time despite the inherent delays in the network. To synchronize, the slave clock may determine two values: (1) delay and (2) offset. Delay represents the time it takes for a message sent to traverse between the master clock and the slave clock. Offset represents a difference between the receiver clock relative to the master clock. To determine delay and offset, the master clock and slave clock exchange messages.

As shown in FIG. 1, the master clock 105 sends a synchronization (sync) message 120 to the slave clock 110. Note that sync messages may be sent periodically from the master clock 105 to the slave clock 110. Depending upon the implementation used, there may be a one-step message exchange (i.e., only the sync message 120 is sent) or a two-step message exchange (i.e., a sync message 120 and a follow-up message 125 are sent). The one-step message implementation is typically used for hardware-implemented PTP embodiments, and the two-step message exchange implementation is helpful if packet modification support is not available in hardware.

For a one-step message exchange, each sync message 120 contains a timestamp representing the master clock's time when the sync message was sent, in this example, $t_1$. The receiving clock 110 receives the message 120 and notes the time it received the sync message, in this case $t_2$.

For two-step message exchange, a follow-up message 125 is transmitted to the receiver 110 immediately after the sync message 120. The follow-up message 125 includes the time when the sync message 120 was transmitted, $t_1$, because the $t_1$ value was not in the sync message 120.

In the depicted example, the slave clock 110 sends a delay request message 130 to the master clock 105. The slave clock 110 also notes the time ($t_3$) when it sent the message to the master clock. The master clock 105 receives this message 130, records the time it received this message ($t_4$), and informs the slave clock of that time via a delay response message 135. At this point, the slave clock 110 is aware of all four times ($t_1$, $t_2$, $t_3$, $t_4$), which it can use to determine delay and offset.

Concerning delay, a one-way delay (OWD) may be determined by the following formula:

$$\text{delay} = ((t_2 - t_1) + (t_4 - t_3))/2$$

Note that delay is an average of the time it took for the messages to travel between the master clock and the slave clock. The delay in the forward path (i.e., from the master clock to the slave clock) may not always be the same as the delay in the backward path (i.e., from the slave clock to the master clock).

The offset may be determined by the following formula:

$$\text{offset} = ((t_2 - t_1) - (t_4 - t_3))/2$$

Given the offset, the slave clock can adjust its clock to align with the master clock's time.

While having time synchronization is important, establishing time synchronization involves a certain amount of overhead. Participation in PTP can involve exchanging a number of messages. Consider the following example.

Figure 2:
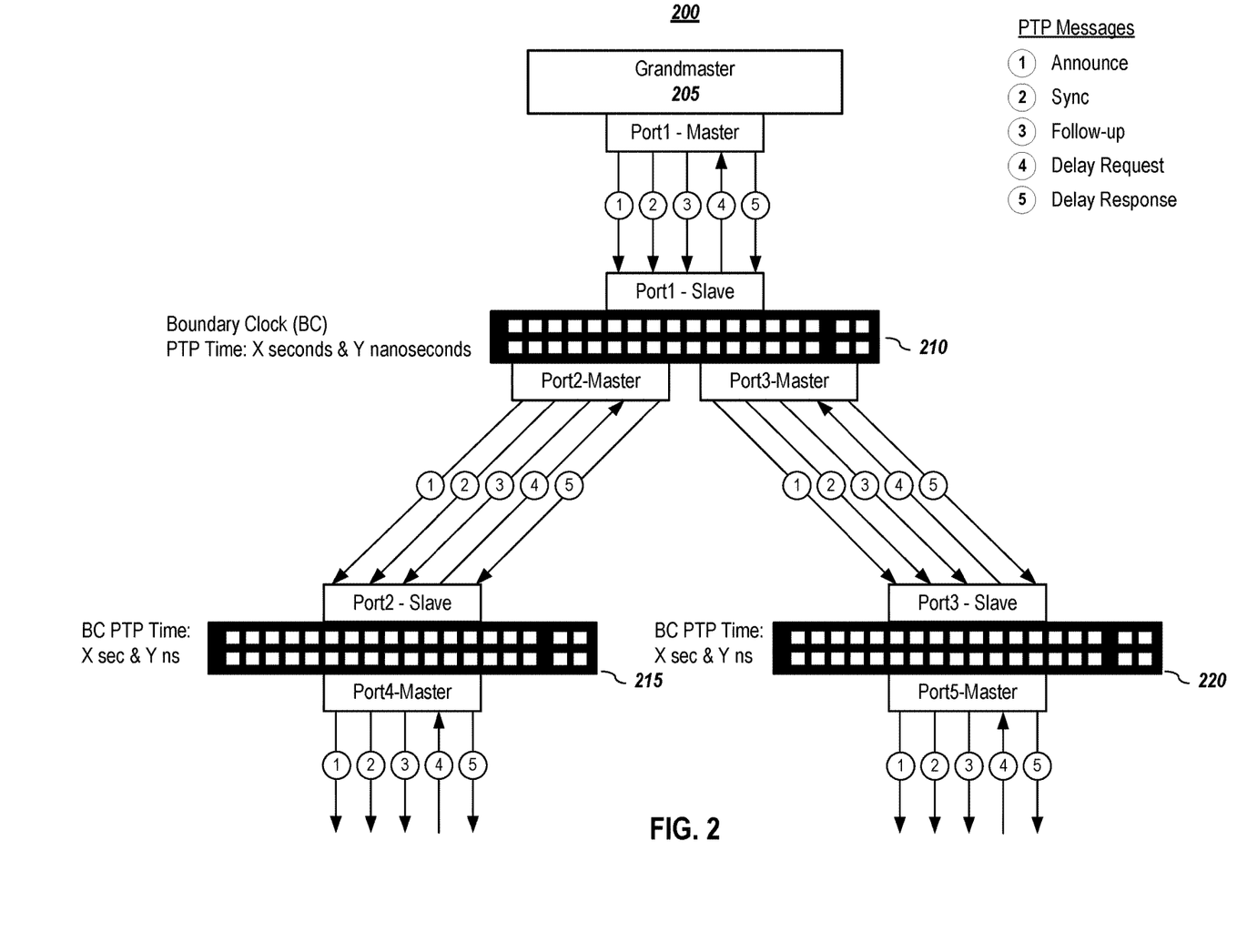
FIG. 2 illustrates an example network topology and some of the message overhead involved in a Precision Time Protocol (PTP) synchronization, according to embodiments of the present disclosure.

A typical use case of PTP involves a network switch operating as a boundary clock (BC). FIG. 2 depicts an example network, according to embodiments of the present disclosure. A boundary clock 210 lies in a network 200 between an upstream node 205 (which may be referred to as a grandmaster clock) and one or more other downstream clocks (e.g., 215 and 220), which may be switches, servers, Radio Units, etc. The downstream clocks 215 and 222 are also acting as boundary clocks, but downstream clocks may be ordinary clocks. The boundary clock 210 runs PTP on three interfaces, in which one interface (Port 1-Slave) connects to the grandmaster clock 205 and two interfaces (Port 2-Master and Port 3-Master) each connect to a downstream clock (device 215 and device 220, respectively). Boundary clocks may be used to synchronize one network segment with another. The upstream interface connected to the grandmaster clock has a slave role, while the downstream interfaces connected to the other clocks have a master role.

FIG. 2 not only illustrates an example network topology, but it also illustrates the message overhead involved in PTP synchronization. Depending upon the implementation, for each master-slave set of devices interchange, there can be five (5) messages: announce, sync, follow-up, delay request, and delay response. As illustrated in FIG. 2, when additional clocks (e.g., device 215, device 220, etc.) are also synchronized, the overhead cost (e.g., generating messages, transmitting messages, processing messages, etc.) becomes significant. Based on default rate of an ITU (International Telecommunication Union) G.8275.1 profile (which is PTP protocol used in cellular networks and is incorporated by reference herein in its entirety), a two-step boundary clock with 47 master ports and 1 slave port needs to send 2648 packets per second and receives 808 packets per second.

Also recall that this set of messages gets repeated periodically between each set of devices according to some default rate, which greatly adds to the processing at each node and to the overall level of network traffic. The higher the rate of repeating the set of PTP messages reduces the time for synchronization convergence with accuracy. However, having a high packet rate of PTP messages is problematic because it consumes compute and network resources. For example, handling messages (e.g., generating messages, transmitting messages, receiving messages, etc.) places increased load on the processor(s) of a system. This increased computation load can affect the general performance of the system and its handling of other protocols. The increase in messages also leads to increased network congestion, which may cause packet delay variation and can impact accuracy. Also, given control plane protocol packet rate limits and policing at the system level, there are possibilities of PTP ad hoc packet dropping on the network switch, depending upon other protocols running on the system. Thus, a problem with a high number of PTP packets is that there may not be any cushion for absorbing other burst traffic on the system or to accommodate other heavy protocols (e.g., Bidirectional Forwarding Detection (BFD)) without having PTP packets dropped.

Accordingly, the present disclosure includes embodiments that enable dynamic packet rate for PTP implementations based on learned data (e.g., stability and accuracy). Learning accuracy and/or stability of synchronization may be done on time receiver data of the boundary clock. In one or more embodiments, accuracy and stability may be measured using constant time error (cTE) and Maximum Time Interval Error (MTIE). Each of these measures or metrics are explained in more detail below.

Even when a clock has been synchronized to a master clock, some errors or discrepancies between clock signals may still exist. Given that the master clock is taken as the reference, errors are gauged or detected in the slave clock. Differences between the master clock and the slave clock are called time error (TE). TE represents an instantaneous measure between the two clocks.

Figure 3:
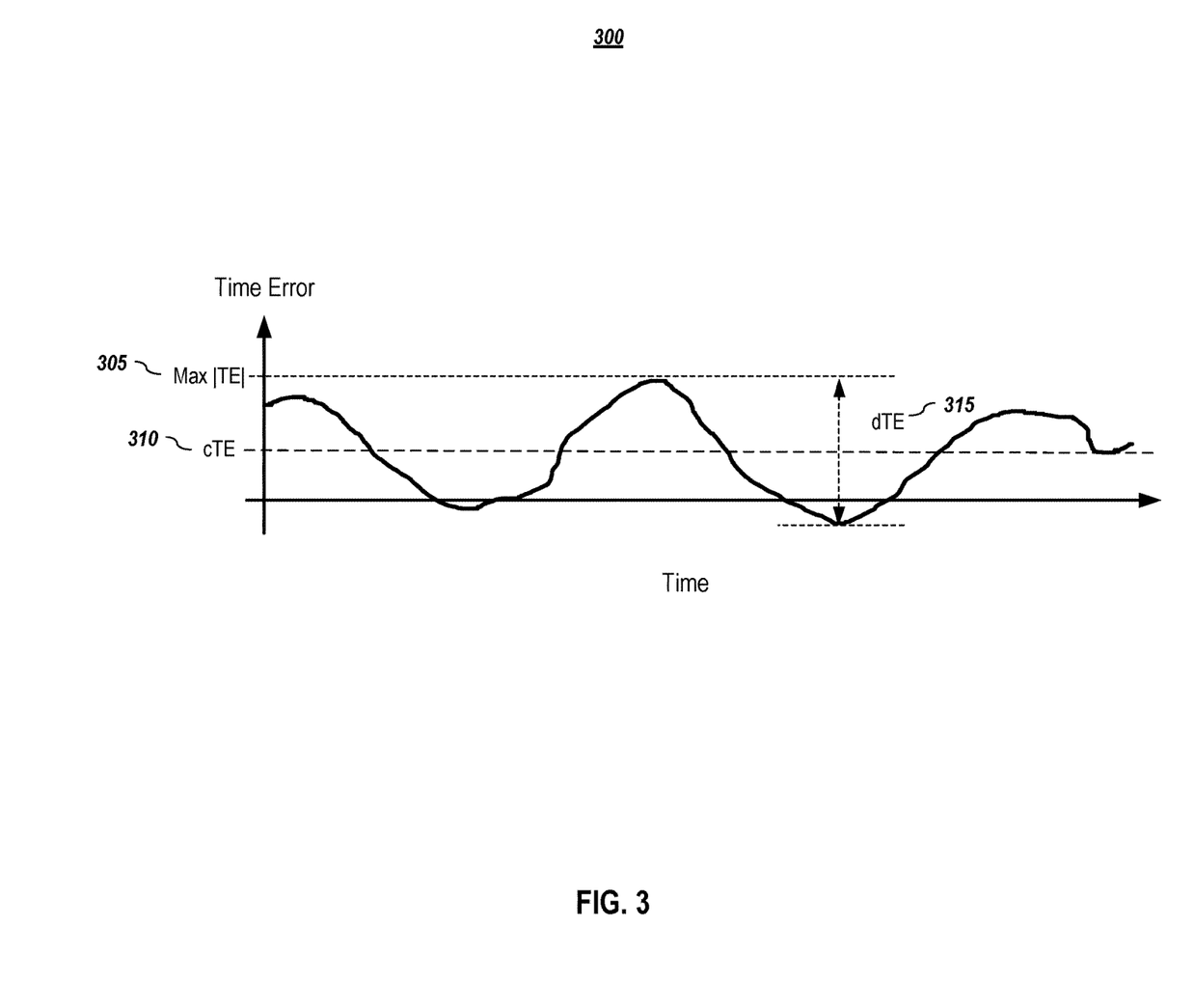
FIG. 3 depicts an example of time error (TE) values plotted on a graph over time, according to embodiments of the present disclosure.

When the slave clock lags the master clock, it is deemed a negative TE, when the slave clock signal leads the master clock signal, it is deemed a positive TE, and when there is no discrepancy, the TE value is zero. TE measurements may be taken at certain instances (e.g., at clock signal edges) over a time period. FIG. 3 depicts an example of TE values plotted on a graph over time, according to embodiments of the present disclosure.

As shown in FIG. 3, the clock errors may vary over time, so clock errors are typically measured over a time period. For the depicted measurement interval, different statistical measures related to TE may be obtained. One is maximum absolute time error, or max|TE| 305, which may be defined as the maximum absolute value of the time error observed over the measurement interval.

Also depicted in FIG. 3 is a constant time error (cTE) 310, which represents the mean of the TE values of the measurement interval (i.e., averaging TE measurements over a measurement time interval). The cTE value represents an average offset from the reference clock as a single value. Because it measures an average difference from the reference clock, cTE is a good measure of the accuracy of a clock.

Another measure is dynamic time error (dTE). dTE represents the variation of TE over a certain time interval. As depicted in FIG. 3, dTE 315 represents a difference between the minimum and maximum TE during the measurement. dTE may be considered as a measure of the stability of the clock. dTE may be further statistically analyzed using two other metrics: maximum time interval error (MTIE) and time deviation (TDEV).

Time interval error (TIE) is the measure of the change in the TE over a time period. That is, TIE is the difference between the TE values of the time period (i.e., the difference between the corresponding time error values). Recall that TE is an instantaneous measure between the master and slave clocks, whereas the TIE is the error accumulated over the interval of an observation. Thus, TIE may be considered to measure a total error that a slave clock has accumulated as compared to the master clock since the beginning of the time period.

Figure 4:
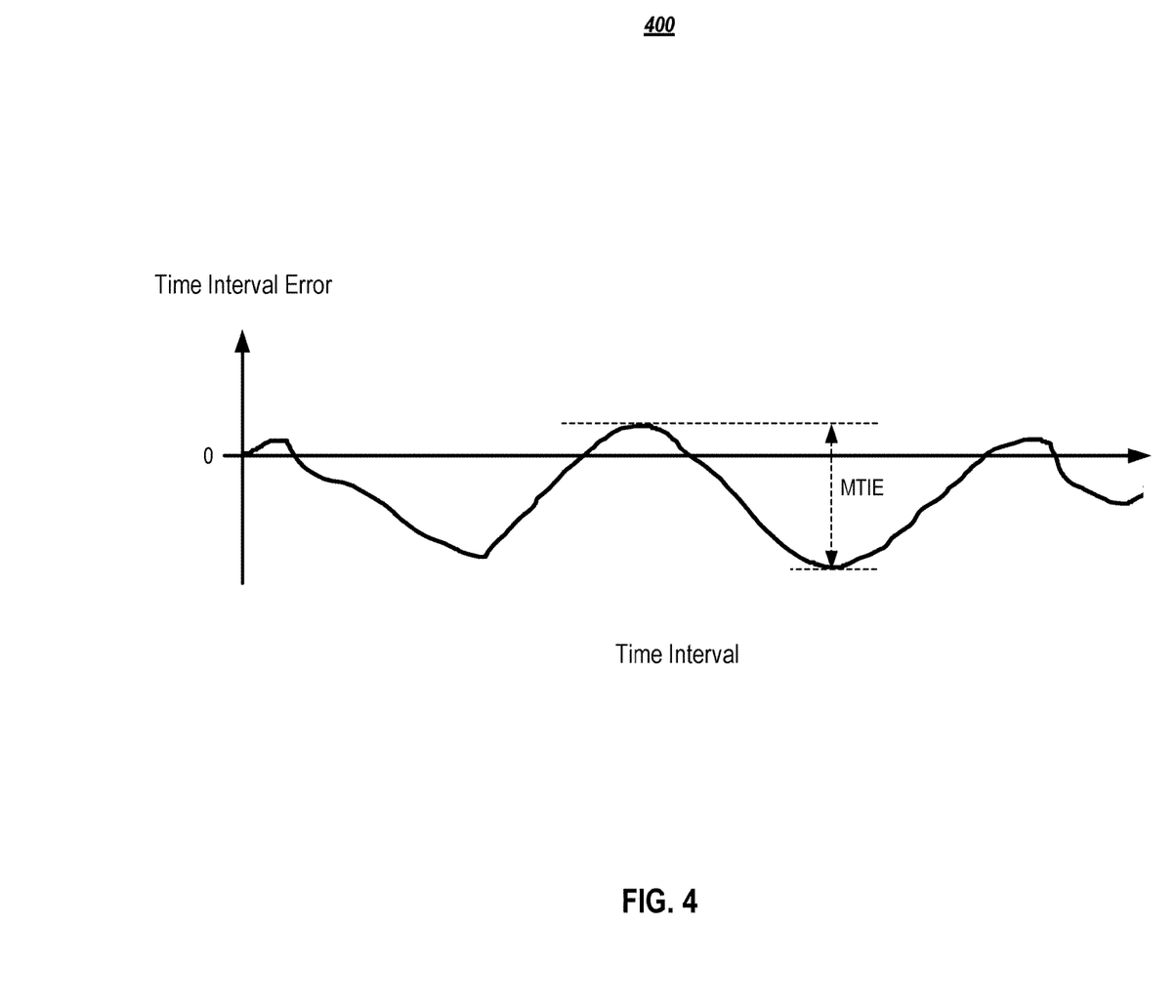
FIG. 4 depicts an example of maximum time interval error (MTIE), according to embodiments of the present disclosure.

The maximum variation of the TIE within a time period is known as the maximum time interval error (MTIE). FIG. 4 depicts an example of MTIE, according to embodiments of the present disclosure. As illustrated, the MTIE may be defined as a maximum peak-to-peak delay variation in TIE for a time period. TDEV may be defined as a measure of the expected time variation of the slave clock signal as a function of integration time. Unlike MTIE, which records the difference between the high and low peaks of TIE, TDEV focuses on frequency and stability of such variations over the given time period.

B. Method Embodiments

Figure 5A:
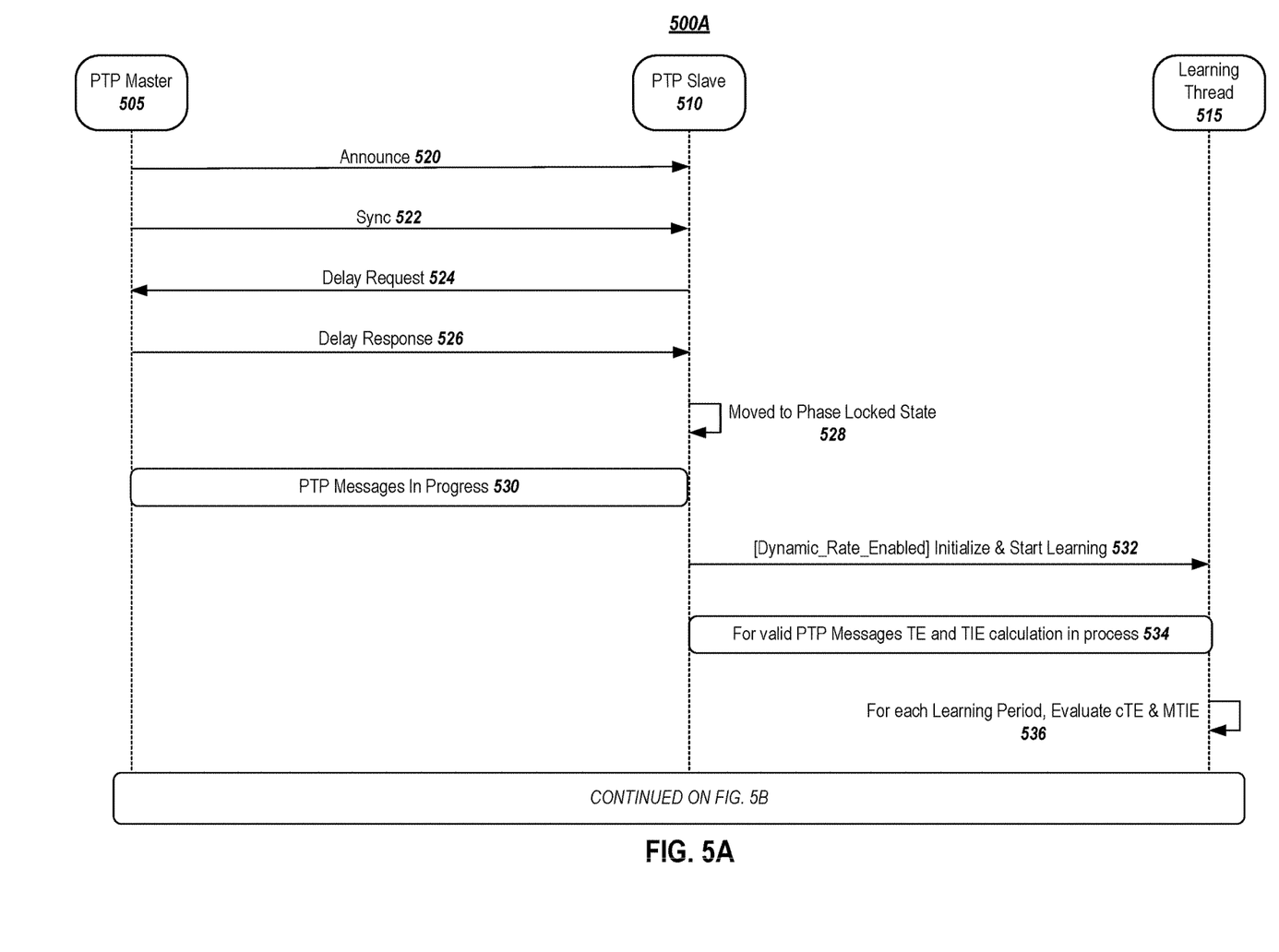
FIGS. 5A and 5B depict a high-level sequence overview of dynamic rate clock synchronization, according to embodiments of the present disclosure.
Figure 5B:
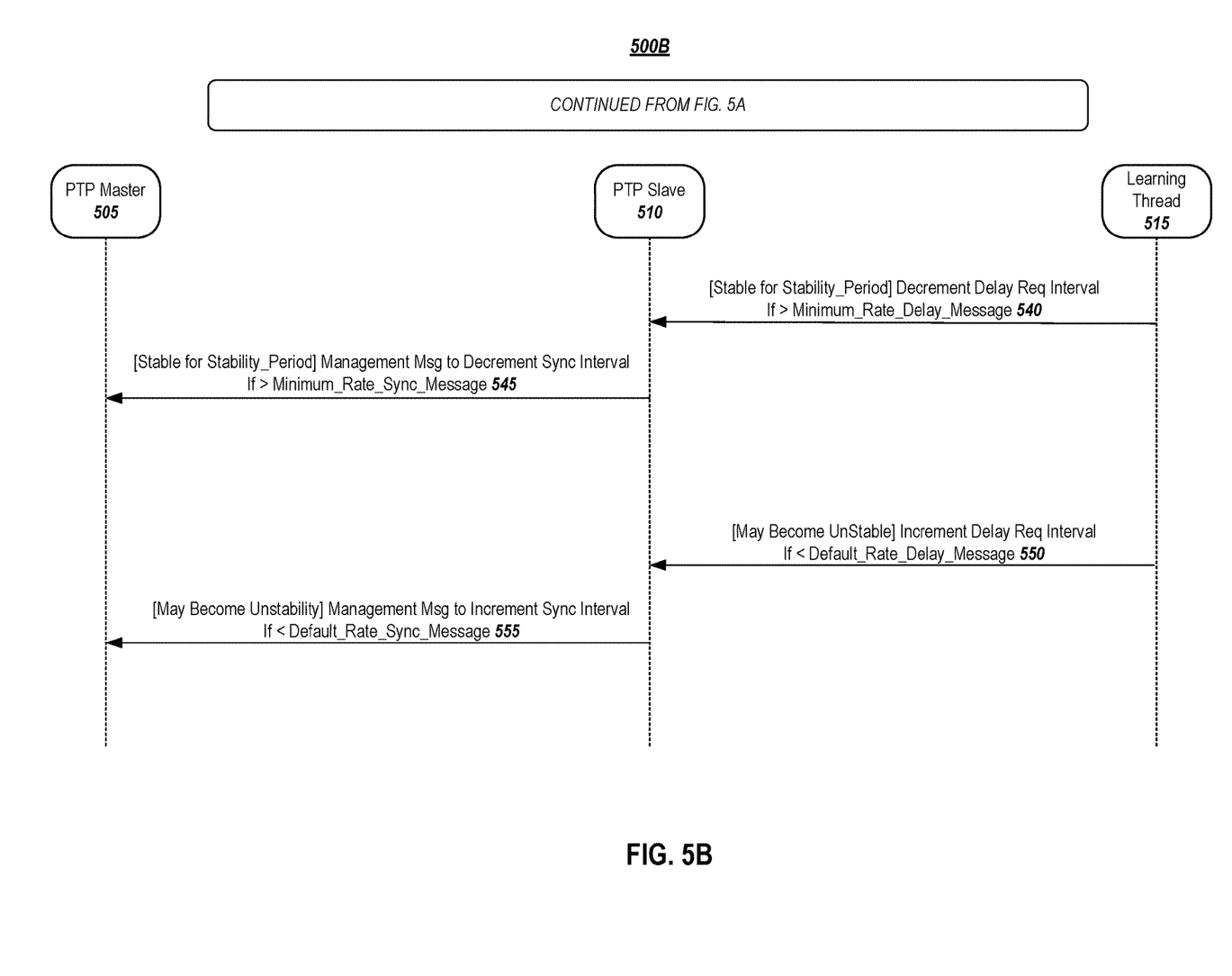

FIGS. 5A and 5B depict a high-level sequence overview of dynamic rate clock synchronization, according to embodiments of the present disclosure. As illustrated, the network comprises a PTP master clock 505, a PTP slave clock 510, and a learning thread 515 operating on device with the slave clock or otherwise supporting the PTP slave clock 510.

In one or more embodiments, the methodology 500 may commence like typical PTP protocols. FIG. 5A illustrates a one-step message exchange, but a two-step message exchange may also be used. Thus, the master clock 505 sends an announcement message 520 and a sync message 522 to the slave clock 505. The slave clock replies with a delay request message 524 and the master clock answers with a delay response message 526. This process is typical PTP synchronization as discussed above and may continue 528 until the clocks are deemed to be synchronized. Two clocks that are synchronized may also be referred to as being in a phase locked state. Also as noted above, the master clock and slave clock may repeat 530 the message passing process (e.g., steps 520-526).

Unlike the typical PTP process, the slave clock may perform a learning methodology 515 to determine whether the slave clock can reduce the message passing rate while still maintaining synchronization within a threshold level. In one or more embodiments, the slave device may have an enable dynamic rate for clock synchronization/disable dynamic rate for clock synchronization setting. If the dynamic rate setting has been enabled (e.g., enabled by an administrator or user), the device 510 will start collecting (532) information. In one or more embodiments, the device 510 may collect timing information related to valid PTP messages to calculate (534) TE and TIE values. During a learning period (which may be configurable), the system 510 may use the TE and TIE values to determine and evaluate (536) cTE and MTIE to gauge stability and accuracy—although different metrics may be used.

Continuing now with FIG. 5B, if the clock signal has been stable for a stability period (which may be configurable) based upon metrics such as cTE and MTIE, the slave clock may decrease (540) its delay request message interval rate if it is not already at a minimum delay request message rate. Note that the amount that the delay request message interval rate is decreased and the minimum may both be configurable parameters. Assuming that the delay request message interval rate is not at the minimum value, in one or more embodiments, the slave device 510 may send (545) a management message to the master device 505 that it should decrease its sending of sync messages—but only if the sync message interval rate is not already at a minimum (which may be configurable).

On the other hand, if the clock signal has become unstable or appears to be becoming unstable based upon metrics such as cTE and MTIE, the slave clock may increase (550) its delay request message interval rate, if it is currently less than a default delay request message rate. Note that the amount that the delay request message interval rate is increased and the default delay message rate may be configurable parameters. Assuming that the delay message rate is less than the default deal message rate value, in one or more embodiments, the slave device 510 may send (550) a management message to the master device 505 that it should increase its sending of sync messages—but only if the sync message interval rate is less than a default sync message rate (which may be configurable).

Figure 6:
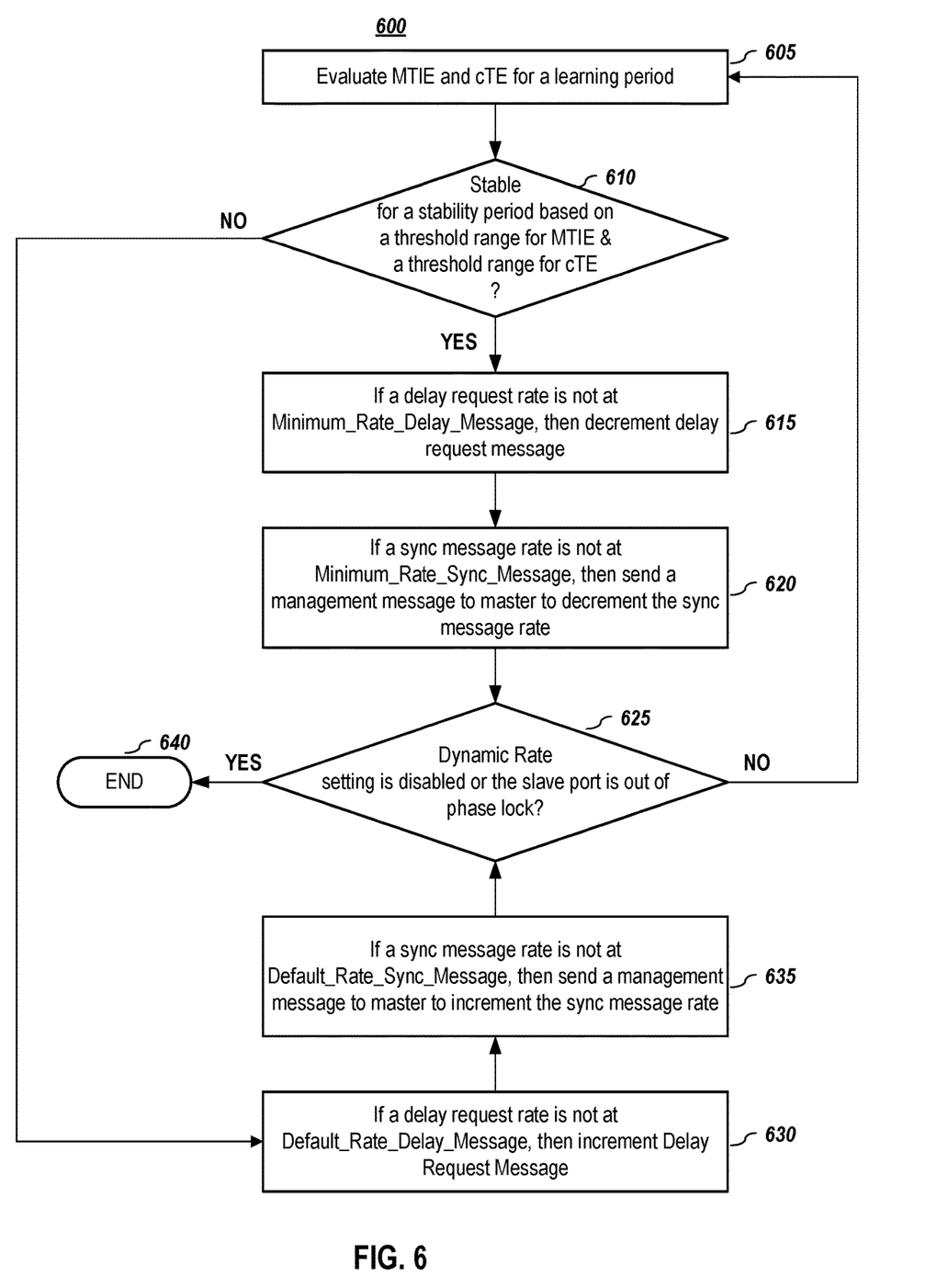
FIG. 6 depicts a methodology for dynamic clock synchronization, according to embodiments of the present disclosure.

FIG. 6 depicts a methodology for dynamic clock synchronization, according to embodiments of the present disclosure. In one or more embodiments, maximum time interval error (MTIE) and constant time error (cTE) metrics are obtained and evaluated (605) for a learning period for a system that includes a first information handling system comprising a master clock and a second information handling system comprising a slave clock. Responsive to clock synchronization between the master clock and the slave clock being stable (610) for a stability period based on one or more metrics, the slave clock/second information handling system may perform the following. First, in one or more embodiments, if a delay request message rate for the slave clock is not at a minimum delay request message rate, the slave clock/second information handling system may decrease (615) the delay request message rate. And, in one or more embodiments, if a sync message rate is not at a minimum sync message rate, the slave clock/second information handling system may send (620) a management message to the first information handling system to decrement its sync message rate. The decrease in rate may be by a logarithmic amount, may be by a non-logarithmic amount, or may be related to or a function of one or more metrics related to stability.

However, in one or more embodiments, responsive to the slave clock/second information handling system detecting (610) an increase in instability based on one or more metrics, the slave clock/second information handling system may perform the following. First, in one or more embodiments, if a delay request message rate is not at a default delay request message rate, the slave clock/second information handling system may increment (630) the delay request message rate. Also, in one or more embodiments, if a sync message rate is not at a default sync message rate, the slave clock/second information handling system may send (635) a management message to the first information handling system to increase the sync message rate. The increase in rate may be by a logarithmic amount, may be by a non-logarithmic amount, or may be related to or a function of one or more metrics related to the instability or decrease in stability.

In one or more embodiments, the system may be maintained in a stable state by repeating (625) until the second information handling system becomes out of phase lock with the master clock due to valid reasons not related to the dynamic message rate mechanism or the disenabling of a setting to not perform dynamic synchronizing of the clocks.

In one or more embodiments, the one or more metrics that may be used to determine stability may be one or more of MTIE, cTE, or both. For example, the step of detecting an increase in instability based on one or more metrics may comprise detecting the MTIE being out of a MTIE threshold range, detecting the cTE being out a cTE threshold range, or both.

In one or more embodiments, one or more of the following parameters may be configurable (and example default settings are provided):
- a dynamic rate setting for enabling/disabling performing dynamic synchronizing of clocks-Dynamic_Rate_Enable (e.g., Default: False);
- a default sync message rate-Default_Rate_Sync_Message (e.g., Default: 16 packets per second (pps) for a G.8275.1 profile);
- a minimum sync message rate-Minimum_Rate_Sync_Messages (e.g., Default: 4 pps for a G.8275.1 profile);
- a default delay message rate-Default_Rate_Delay_Message (e.g., Default: 16 pps for a G.8275.1 profile)
- a minimum delay request message rate-Minimum_Rate_Delay_Messages (e.g., Default: 4 pps for a G.8275.1 profile);
- a MTIE threshold range-Threshold_Range_MTIE (e.g., Default: 8 nanoseconds (ns) for a G.8275.1 profile);
- a cTE threshold range-Threshold_Range_cTE (e.g., Default: 8 ns for a G.8275.1 profile);
- a learning period-Learning_Period (e.g., Default: 60 seconds); and
- a stability period-Stability_Period (e.g., Default: 5×Learning_Period).

C. Additional Embodiments

When collecting values or determining metrics related to one or more embodiments herein, one or more sampling and/or filtering methods may be employed. For example, synchronization methods typically have many configurable parameters for filtering packets with the high packet delay variation (i.e., outlier packets). Such filtering parameters may be leveraged to obtain valid sample data, which may be used to determine one or more of the metrics described herein.

Also, in a hybrid mode of PTP, frequency synchronization may be performed by Synchronous Ethernet (SyncE), where the messages are used for time of day (ToD) and/or phase syncing. In such cases, employing a dynamic PTP message rate embodiment may be even more relevant as the frequency is already synchronized based on SyncE where PTP messages are not involved. Higher packet rate may be used for synchronizing time of day and phase, which may be efficiently handled by dynamic PTP message rate embodiments as frequency deviation based on PTP messages are not applicable in this case.

D. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 7:
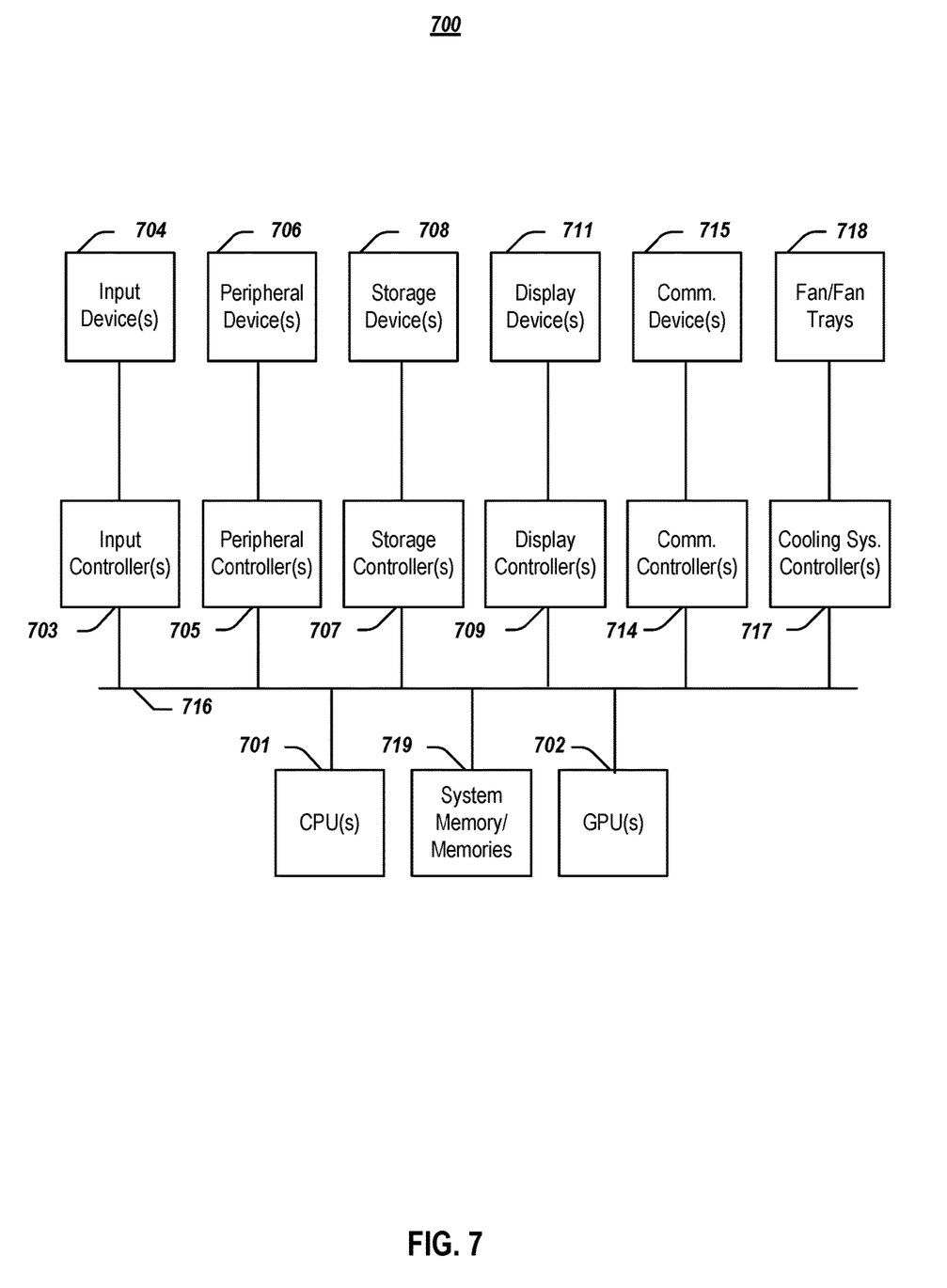
FIG. 7 depicts a simplified block diagram of an information handling system, according to embodiments of the present disclosure.

FIG. 7 depicts a simplified block diagram of an information handling system (or computing system), according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more CPUs 701 that provides computing resources and controls the computer. CPU 701 may be implemented with a microprocessor or the like and may also include one or more graphics processing units (GPU) 702 and/or a floating-point coprocessor for mathematical computations. In one or more embodiments, one or more GPUs 702 may be incorporated within the display controller 709, such as part of a graphics card or cards. The system 700 may also include a system memory 719, which may comprise RAM, ROM, or both.

A number of controllers and peripheral devices may also be provided, as shown in FIG. 7. An input controller 703 represents an interface to various input device(s) 704, such as a keyboard, mouse, touchscreen, stylus, microphone, camera, trackpad, display, etc. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present disclosure. Storage device(s) 708 may also be used to store processed data or data to be processed in accordance with the disclosure. The system 700 may also include a display controller 709 for providing an interface to a display device 711, which may be a cathode ray tube (CRT) display, a thin film transistor (TFT) display, organic light-emitting diode, electroluminescent panel, plasma panel, or any other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. While not depicted in FIG. 7, the information handling system may comprise one or more clock or clock signal generators, which may serve as a master clock, a boundary clock, an ordinary clock, or a combination thereof.

As shown in the depicted embodiment, the computing system 700 comprises one or more fans or fan trays 718 and a cooling subsystem controller or controllers 717 that monitors thermal temperature(s) of the system 700 (or components thereof) and operates the fans/fan trays 718 to help regulate the temperature.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 8:
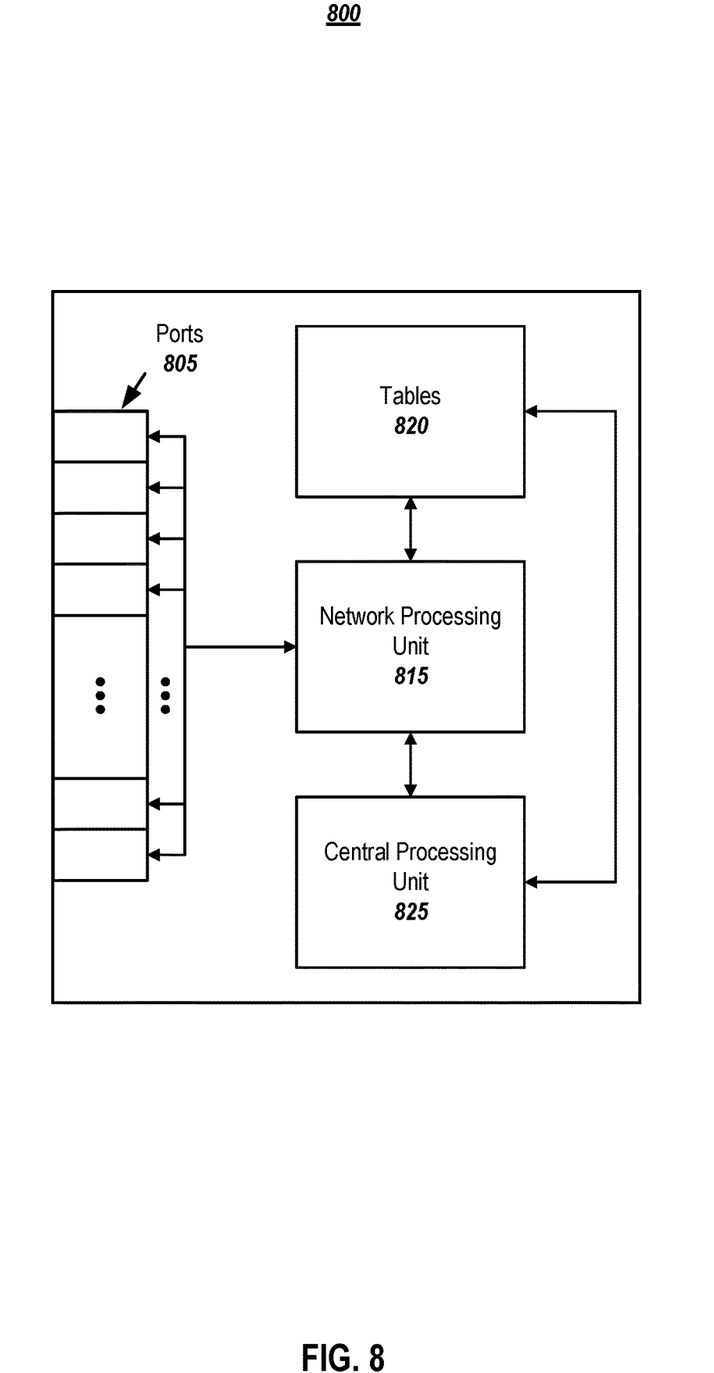
FIG. 8 depicts an alternative block diagram of an information handling system, according to embodiments of the present disclosure.

FIG. 8 depicts an alternative block diagram of an information handling system, according to embodiments of the present disclosure. It will be understood that the functionalities shown for system 800 may operate to support various embodiments of the present disclosure—although it shall be understood that such system may be differently configured and include different components, additional components, or fewer components.

The information handling system 800 may include a plurality of I/O ports 805, a network processing unit (NPU) 815, one or more tables 820, and a CPU 825. The system includes a power supply (not shown) and may also include other components, which are not shown for sake of simplicity.

In one or more embodiments, the I/O ports 805 may be connected via one or more cables to one or more other network devices or clients. The network processing unit 815 may use information included in the network data received at the node 800, as well as information stored in the tables 820, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media comprising one or more sequences of instructions, which, when executed by one or more processors or processing units, causes steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented/processor-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A processor-implemented method for dynamic synchronizing of clocks in a distributed system, the method comprising:
   evaluating a maximum time interval error (MTIE) and a constant time error (cTE) for a learning period for a system comprising a first information handling system comprising a master clock and a second information handling system comprising a slave clock;
   responsive to clock synchronization between the master clock and the slave clock being stable for a stability period based on one or more metrics:
      if a delay request message rate is not at a minimum delay request message rate, decreasing the delay request message rate; and
      if a sync message rate is not at a minimum sync message rate, sending a management message to the first information handling system to decrement the sync message rate; and
   responsive to detecting an increase in instability based on one or more metrics:
      if a delay request message rate is not at a default delay request message rate, incrementing the delay request message rate; and
      if a sync message rate is not at a default sync message rate, sending a management message to the first information handling system to increase the sync message rate.

2. The processor-implemented method of claim 1 further comprising:
   repeating the steps of claim 1 unless the second information handling system becomes out of phase lock with the master clock.

3. The processor-implemented method of claim 1 further comprising:
   not starting the steps of claim 1 until:
      the slave clock is phase locked with the master clock; and
      a setting to perform dynamic synchronizing of clocks is enabled.

4. The processor-implemented method of claim 1 wherein:
   the one or more metrics comprise a MTIE threshold range, a cTE threshold range, or both.

5. The processor-implemented method of claim 1 wherein the step of detecting an increase in instability based on one or more metrics comprises:
   detecting the MTIE being out of a MTIE threshold range; or
   detecting the cTE being out of a cTE threshold range.

6. The processor-implemented method of claim 5 wherein one or more of the following parameters are configurable:
   default delay request message rate;
   minimum delay request message rate;
   default sync message rate;
   minimum sync message rate;
   minimum delay message rate;
   MTIE threshold range;
   cTE threshold range;
   learning period; and
   stability period.

7. The processor-implemented method of claim 1 wherein:
   increasing or decreasing by a logarithmic amount.

8. An information handling system comprising:
   one or more processors; and
   a non-transitory computer-readable medium or media comprising one or more sets of instructions which, when executed by at least one of the one or more processors, causes steps to be performed comprising:
      evaluating a maximum time interval error (MTIE) and a constant time error (cTE) for a learning period for a system comprising a first information handling system comprising a master clock and the information handling system comprising a slave clock;
      responsive to clock synchronization between the master clock and the slave clock being stable for a stability period based on one or more metrics:
         if a delay request message rate is not at a minimum delay request message rate, decreasing the delay request message rate; and
         if a sync message rate is not at a minimum sync message rate, sending a management message to the first information handling system to decrement the sync message rate; and
      responsive to detecting an increase in instability based on one or more metrics:
         if a delay request message rate is not at a default delay request message rate, incrementing the delay request message rate; and
         if a sync message rate is not at a default sync message rate, sending a management message to the first information handling system to increase the sync message rate.

9. The information handling system of claim 8 wherein the non-transitory computer-readable medium or media further comprises one or more sets of instructions which, when executed by at least one of the one or more processors, causes steps to be performed comprising:
   repeating the steps of claim 8 unless the information handling system becomes out of phase lock with the master clock.

10. The information handling system of claim 8 wherein the non-transitory computer-readable medium or media further comprises one or more sets of instructions which, when executed by at least one of the one or more processors, causes steps to be performed comprising:
   not starting the steps of claim 8 until:
      the slave clock is phase locked with the master clock; and
      a setting to perform dynamic synchronizing of clocks is enabled.

11. The information handling system of claim 8 wherein:
   the one or more metrics comprise a MTIE threshold range, a cTE threshold range, or both.

12. The information handling system of claim 8 wherein the step of detecting an increase in instability based on one or more metrics comprises:
   detecting the MTIE being out of a MTIE threshold range; or
   detecting the cTE being out of a cTE threshold range.

13. The information handling system of claim 12 wherein one or more of the following parameters are configurable:
   default delay request message rate;
   minimum delay request message rate;
   default sync message rate;
   minimum sync message rate;
   minimum delay message rate;

MTIE threshold range;
cTE threshold range;
learning period; and
stability period.

14. The information handling system of claim 8 wherein: increasing or decreasing is done by a logarithmic amount.

15. A non-transitory computer-readable medium or media comprising one or more sequences of instructions which, when executed by at least one processor, causes steps to be performed comprising:
    evaluating a maximum time interval error (MTIE) and a constant time error (cTE) for a learning period for a system comprising a first information handling system comprising a master clock and a second information handling system comprising a slave clock;
    responsive to clock synchronization between the master clock and the slave clock being stable for a stability period based on one or more metrics:
        if a delay request message rate is not at a minimum delay request message rate, decreasing the delay request message rate; and
        if a sync message rate is not at a minimum sync message rate, sending a management message to the first information handling system to decrement the sync message rate; and
    responsive to detecting an increase in instability based on one or more metrics:
        if a delay request message rate is not at a default delay request message rate, incrementing the delay request message rate; and
        if a sync message rate is not at a default sync message rate, sending a management message to the first information handling system to increase the sync message rate.

16. The non-transitory computer-readable medium or media of claim 15 further comprising one or more sequences of instructions which, when executed by at least one processor, causes steps to be performed comprising:
    repeating the steps of claim 15 unless the second information handling system becomes out of phase lock with the master clock.

17. The non-transitory computer-readable medium or media of claim 15 further comprising one or more sequences of instructions which, when executed by at least one processor, causes steps to be performed comprising:
    not starting the steps of claim 15 until:
        the slave clock is phase locked with the master clock; and
        a setting to perform dynamic synchronizing of clocks is enabled.

18. The non-transitory computer-readable medium or media of claim 15 wherein:
    the one or more metrics comprise a MTIE threshold range, a cTE threshold range, or both.

19. The non-transitory computer-readable medium or media of claim 15 wherein the step of detecting an increase in instability based on one or more metrics comprises:
    detecting the MTIE being out of a MTIE threshold range; or
    detecting the cTE being out of a cTE threshold range.

20. The non-transitory computer-readable medium or media of claim 19 wherein one or more of the following parameters are configurable:
    default delay request message rate;
    minimum delay request message rate;
    default sync message rate;
    minimum sync message rate;
    minimum delay message rate;
    MTIE threshold range;
    cTE threshold range;
    learning period; and
    stability period.

* * * * *